United States Patent [19]

Ogino et al.

[11] Patent Number: 4,952,850
[45] Date of Patent: Aug. 28, 1990

[54] HORIZONTAL DEFLECTION CIRCUIT

[75] Inventors: Masanori Ogino; Takeo Yamada; Miyuki Ikeda, all of Yokohama, Japan

[73] Assignee: Hitachi, Ltd., Tokyo, Japan

[21] Appl. No.: 378,905

[22] Filed: Jul. 12, 1989

[30] Foreign Application Priority Data

Aug. 3, 1988 [JP] Japan ................................. 63-192614

[51] Int. Cl.$^5$ ........................ H01J 29/70; H01J 29/76
[52] U.S. Cl. ..................................... 315/387; 315/403
[58] Field of Search ................ 315/396, 397, 387, 389, 315/403, 408

[56] References Cited

U.S. PATENT DOCUMENTS 4,361,785 11/1982 Stapleton ............................ 315/389

Primary Examiner—Gregory C. Issing
Attorney, Agent, or Firm—Antonelli, Terry, Stout & Kraus

[57] ABSTRACT

A horizontal deflection circuit for a multiple scan display, capable of controlling the horizontal deflection voltage for a plurality of horizontal scanning frequencies. The output power of the amplifier is controlled on the basis of the result of detection of the data of horizontal size of the image plane so that the horizontal size of the image plane is adjusted to a predetermined size. The data of horizontal size of the image plane is obtained through the detection of the amplitude of a flyback pulse signal. The amplitude of a sawtooth signal for horizontal scanning is controlled according to the deviation of the detected amplitude of the flyback pulse signal from a predetermined value. The horizontal deflection circuit is very simple in construction and is capable of carrying out continuous horizontal deflection according to the horizontal scanning frequency varying in a plurality of levels.

5 Claims, 5 Drawing Sheets

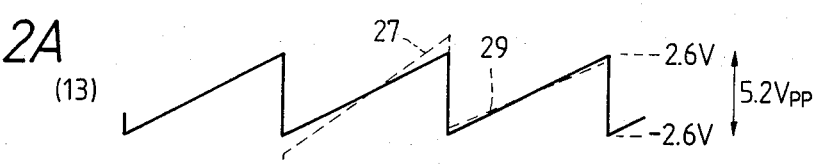
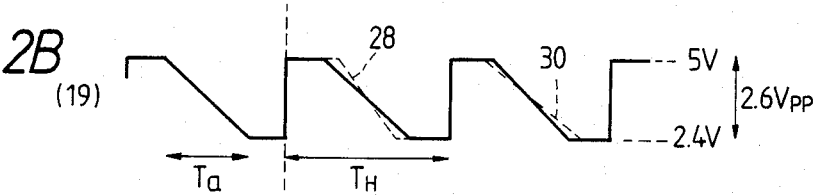
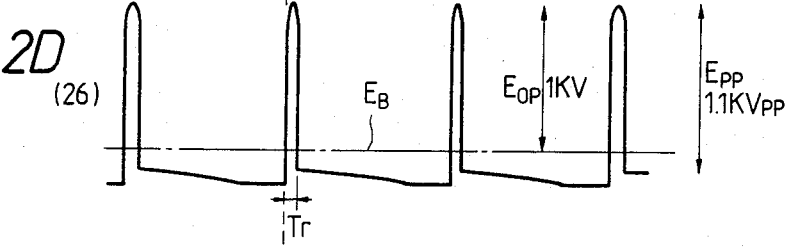
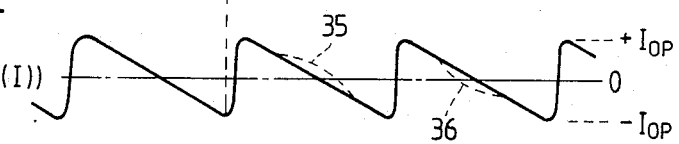

HORIZONTAL DEFLECTION CIRCUIT

BACKGROUND OF THE INVENTION

The present invention relates to a horizontal deflection circuit for a multiple scan display and, more particularly, to a horizontal deflection circuit for a continuous follow-up multiple scan display.

As is described in various literature, the conventional transistorized horizontal deflection circuit employs a horizontal output transistor and a damper diode for switching.

Recently, there has been an increasing demand for the multiple scan display capable of continuously dealing with a plurality of horizontal scanning frequencies to cope with various image signal sources and graphics computer signal sources. The horizontal deflection circuit of the multiple scan display also employs a horizontal output transistor and a damper diode for switching. The multiple scan display also employs a horizontal deflection circuit capable of controlling the supply voltage substantially proportionally to the horizontal scanning frequency.

The conventional horizontal deflection circuit for the proportional control of the supply voltage needs a variable voltage source having a large output capacity. Furthermore, such a horizontal deflection circuit is expensive and has a complicated construction to control the supply voltage in the wide range of about 25 V to about 100 V because the horizontal scanning frequency varies in the wide range of 16 kHz to 64 kHz.

SUMMARY OF THE INVENTION

It is an object of the present invention to provide a horizontal deflection circuit for a multiple scan display, capable of operating from a low-voltage power supply, such as an about 5-volt power supply, having a voltage varying range of several tens percent without using a widely variable high-voltage power supply having a large output capacity.

The object of the invention is achieved by a horizontal deflection circuit comprising push-pull amplifying means, and novel negative feedback circuit means for driving the push-pull amplifying means.

According to the present invention, the push-pull amplifier operates on low-voltage power supply, such as an about 5-volt power supply, to drive a series circuit including a horizontal deflection coil and a capacitor and supplies power of a level exceeding the loss of a deflection system during a scanning time. During a flyback time, the series circuit resonate to a parallel resonance capacitor to generate a flyback pulse, and the negative feedback circuit means enables control of the output power of the push-pull circuit so that the amplitude of the flyback pulse coincides with an amplitude corresponding to a predetermined screen size.

BRIEF DESCRIPTION OF THE DRAWINGS

FIGS. 2A to 2E are waveform charts for explaining the operation of the horizontal deflection circuit of FIG. 1;

DESCRIPTION OF THE PREFERRED EMBODIMENTS

First Embodiment (FIGS. 1, 2A to 2E, 3 and 4)

Figure 1:
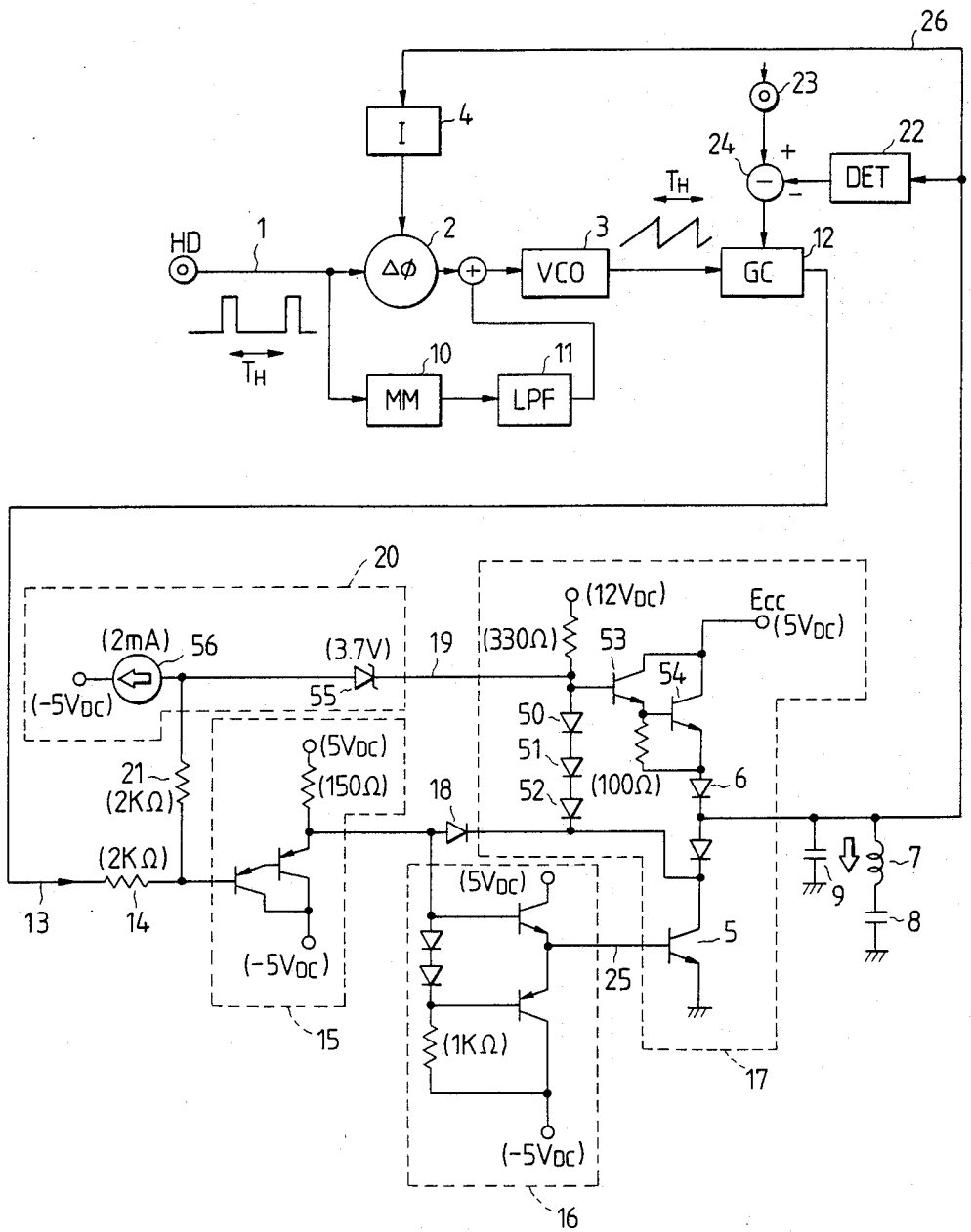
FIG. 1 is a circuit diagram of a horizontal deflection circuit in a first embodiment according to the present invention.

Referring to FIG. 1, there is shown a known PLL (phase-locked loop) circuit comprising a phase detector 2, a voltage-controlled oscillator 3, and an integrating circuit 4 having an input terminal for receiving a flyback pulse and an output terminal for providing a sawtooth signal of a period corresponding to a horizontal scanning period Indicated at 1 is an input horizontal synchronizing signal. A monostable multivibrator 10 and a low-pass filter 11 serve as a known counter detection type frequency discriminator. The low-pass filter 11 provides a voltage proportional to the frequency $f_H$ of the horizontal synchronizing signal 1. The output voltage of the low-pass filter 11 is added to the output of the phase detector 2 to control the frequency of the output signal of the voltage-controlled oscillator 3. The pulse width of the output signal of the monostable multivibrator 10 is fixed at a value smaller than the minimum value of the related horizontal scanning periods $T_H$. The horizontal deflection circuit of the present invention is effective for horizontal scanning frequencies in the range of about 16 kHz to 64 kHz, and hence the pulse width of the output signal of the monostable multivibrator is fixed at about 12 $\mu$sec.

A gain-controlled amplifier 12 and a push-pull amplifier 17 are essential components of the horizontal deflection circuit. The gain-controlled amplifier 12 amplifies the sawtooth signal of a period corresponding to the horizontal scanning period. The amplification factor of the gain-controlled amplifier 12 is controlled according to the output signal of a subtracter 24. The waveform (13) of the output signal of the gain-controlled amplifier 12 is shown in FIG. 2A, in which time is measured on the horizontal axis. In FIG. 2A, a waveform (27) indicated by broken lines is the waveform of the gain-controlled amplifier 12 when the amplification factor is small. A resistor 14 functions as a resistance to an input signal for the following amplifier. A resistor 21 functions as a resistance to a feedback signal. The following amplifier, which will be described below, acts in an active mode in the middle of the horizontal scanning period. The resistors 14 and 21 function as a resistance to an input signal and as a resistance to a feedback signal to a so-called operational amplifier, respectively. Also shown in FIG. 1 are an emitter follower 5, an amplifier 16, a push-pull amplifier 17 driven by the amplifier 16, a horizontal deflection coil 7, a bypass capacitor 8 and a resonance capacitor 9. Although similar to a shunt-regulated push-pull amplifier, the push-pull amplifier 17 has a significant difference from the former in the inclusion of a damper diode 6. The push-pull amplifier 17 is provided with a horizontal output transistor 5. The anode of the damper diode 6 acts in an active mode as part of the push-pull amplifier 17. A diode 18 prevents the excessive saturation of the horizontal output transistor 5 and reduces delay time (storage time) in changing the state of the horizontal output transistor 5 from ON to OFF. As is evident from the waveform (13) shown in FIG. 2A, the output signal of the gain-controlled amplifier 12 is positive in the latter half of the horizontal scanning time. The horizontal output transistor 5 becomes ON near the end of the horizontal scanning time, and the diode 18 prevents the saturation of the potential difference $V_{CE}$ of about 0.6 V or below between the collector and emitter of the horizontal output transistor 5. The potential difference $V_{CE}$ is maintained at about 0.6 V. FIG. 2B shows the voltage waveform (19) of a signal on a line 19. The minimum value of the signal represented by the voltage waveform (19) is about 2.4 V, which corresponds to the sum of the potential difference $V_{CE}$ of about 0.6 V and the potential difference across series-connected diodes 50, 51 and 52, and the maximum value of the same is about 5 V, which is dependent on a supply voltage ECC (5 V) applied to the push-pull amplifier 17. The base-collector junction of Darlington transistors 53 and 54 on the push side of the push-pull amplifier 17 is saturated to suppress the increase of the maximum value beyond 5 V. A level shifter 20 comprises a Zener diode 55 and a current supply 56. The level shifter 20 shifts the average potential 3.7 V of the waveform (19) to the average potential zero volt of the waveform (13). The potential zero volt corresponds to the threshold base voltage of about 0.6 V for turning on the horizontal output transistor 5 and is equivalent to an input voltage of 1.2 V for the amplifier 16 and equivalent to an input voltage of zero volt for the emitter follower 15.

In a section Ta of the waveform (19), the system is in an active negative feedback mode, in which the input waveform (13) is inverted and a signal produced by inverting the input waveform (13) appears on the line 19. Suppose that the potential of a line 13 is increased. Then, the input and output of the emitter follower 15, and the output of the amplifier 16, namely, the base potential of the horizontal output transistor 5, increase, the collector current of the horizontal output transistor 5 increases, the collector potential of the horizontal output transistor 5 decreases, and the potential of the line 19 connected to the three series-connected diodes decreases accordingly. Consequently, an input voltage given through the level shifter 20 and the resistor 21 to the emitter follower 15 decreases. Thus, the increase of the input voltage on the line 13 is suppressed by a negative feed back operation.

FIG. 2C shows the waveform (25) of the base voltage of the horizontal output transistor 5. As mentioned above, variation in base voltage is reduced to a minimum by the negative feedback action in the section Ta of the waveform (19); that is, a small voltage variation causes a large variation in the amplitude of the voltage signal on the line 19. In a section subsequent to the section Ta, the voltage is maintained on a constant level by the limiting effect of the diode 18. The current flowing through the horizontal output transistor 5 is cut off by the stepped drop of the potential of the input signal represented by the waveform (13). At the moment when the current is cut off, the current I flowing through the deflection coil 7 represented by a waveform (27(I)) in FIG. 2E drops to a negative peak $-I_{OP}$. The relation between this initial current and stored electromagnetic energy is expressed by:

$$E_g = L \cdot I_{OP}^2/2 \ldots \quad (1)$$

where $E_g$ is stored electromagnetic energy, and L is the inductance of the deflection coil 7. This initial current and the capacitance C of the resonant capacitor 9 induce resonance and a flyback pulse voltage of a waveform (26) as shown in FIG. 2D. FIG. 2E shows the waveform (27(I)) of the resonant current I. Ordinarily, the capacitance $C_8$ of the bypass capacitor 8 is about 100 times that of the resonant capacitor 9 or greater, and hence the impedance of the bypass capacitor 8 may be neglected during retrace and the voltage across the bypass capacitor 8 may be regarded as a constant voltage $E_8$. Suppose that the amplitude of the flyback pulse, namely, the waveform (26) shown in FIG. 2D, is $E_{OP}$ with respect to the voltage $E_8$, and the loss of the system is neglected. Then the following equations are formed.

$$L \cdot I_{OP}^2/2 = C \cdot E_{OP}^2/2 \ldots \quad (2)$$

therefore, $$E_{OP} = \sqrt{L/C} \, I_{OP} \quad (3)$$

Flyback time $T_r$ is expressed by $$T_r \doteq \pi \sqrt{LC} \quad (4)$$

Examples of the values of the characters in the foregoing equations are:

$I_{OP} = 10A$, $L = 65$ μH, $C = 6.5$ mμF, $E_{OP} = 1kV$ and $T_r = 2$μsec.

The bias voltage $E_8$ of the bypass capacitor 8 is expressed on the basis of the balance of the voltage integrations at the opposite ends of the deflection coil 7 by $$E_8(T_H - T_r) = 2T_r E_{OP}/\pi$$

therefore $$E_8 = (2T_r E_{OP}/\pi)/(T_H - T_r) \ldots \quad (5)$$

When $f_H = 64$ kHz, namely, $T_H = 15.6$ μsec, $E_8 = 93$ V.

Figure 3:
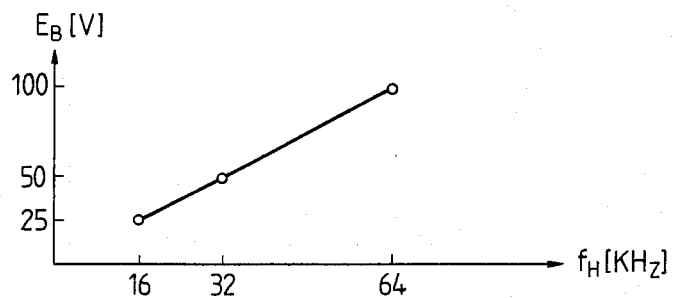
FIG. 3 is a graph showing the dynamic characteristics of the horizontal deflection circuit of FIG. 1.

From equation (3), the amplitude $I_{OP}$ of the deflection current is constant when the voltage $E_{OP}$ is controlled at a fixed value regardless of the variation of the horizontal scanning frequency $f_H$ of the input signal, and hence the horizontal size of the image plane can be fixed. In such a state, the bias voltage with respect to the voltage $E_8$ varies in proportion to the horizontal scanning frequency $f_H$ as shown in FIG. 3. The object can be substantially achieved by maintaining the $E_{PP}$ of the waveform (26) instead of $E_{OP}$.

In FIG. 1, a circuit including a flyback pulse amplitude detector 22, a terminal 23 for horizontal size control and a subtracter 24 controls $E_{PP}$ at a desired value.

Figure 4:
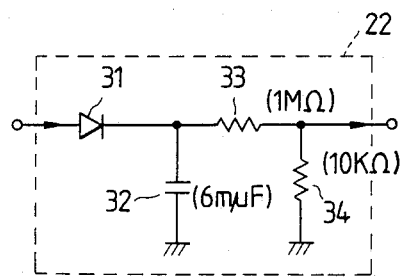
FIG. 4 is a circuit diagram of an essential portion of the horizontal deflection circuit of FIG. 1.

The flyback pulse amplitude detecting circuit 22 is an ordinary amplitude detecting circuit as shown in FIG. 4 comprising a detection diode 31, a smoothing capacitor 32 and shunt resistors 33 and 34. The output voltage of the flyback pulse amplitude detecting circuit 22 is about 10 V dc.

A voltage of about 10 V is applied to the terminal 23. The gain-controlled amplifier 12 may be, for example, an analog multiplier, type MC1495L (Motorola).

The negative feedback operation for fixing the horizontal size will be described hereinafter.

Suppose that the output of the amplitude detector 22 is smaller than a predetermined value, namely, the amplitude of the flyback pulse is smaller than a predetermined value, and hence the horizontal size is smaller than a predetermined size. Then, the output of the subtracter 24 increases and the amplitude of the output of the gain-controlled amplifier 12 having a sawtooth waveform increases as shown by the waveform (27) in FIG. 2A. Consequently, the waveform of the signal on the line 19 changes from the waveform (19) to the waveform (28) indicated by broken lines. A signal having a waveform similar to the waveform (28) is applied to the upper side of the deflection coil 7 during the horizontal scanning time. A voltage increment in the waveform (28) relative to the waveform (19) has a polarity for supplying energy to a system consisting of the deflection coil 7 and the bypass capacitor 8, because the current waveform (27(I)) shown in FIG. 2E is caused to change into a current waveform (35) indicated by broken lines in FIG. 2E by the voltage increment and the polarity of energy corresponding to the integral of the product of the voltage increment and the current waveform (35) is positive; that is, the polarity of charge corresponding to the integral of the current increment in the waveform (35) with respect to time is positive. The charge and the energy increase the potential $E_8$ of the bypass capacitor 8 (FIG. 1), and hence, as obvious from equation (5), the amplitude $E_{OP}$ of the flyback pulse increases. Thus, the amplitude of the flyback pulse is corrected by the negative feedback operation.

When the amplitude of the flyback pulse is smaller than the predetermined value, the signals respectively having the waveforms (13), (19) and (27(I)) are caused to change into signals respectively having waveforms (29), (36) and (36) by the negative feedback operation to correct the amplitude of the flyback pulse.

While the system is in an equilibrium state, power supplied from the push-pull circuit 17 to the deflection coil 7 balances a Joule loss evolved in the deflection coil 7. The Joule loss is represented by a parasitic loss resistance R series-connected to the deflection coil 7. The loss resistance is in the range of about 0.1 to about 0.14 Ω. A potential drop of about ±1.2 V, i.e., 2.4 $V_{PP}$ having a sawtooth waveform is developed across the loss resistance R by the deflection current of ±10 A. The push-pull amplifier 17 supplies power to compensate the potential drop.

Figure 5:
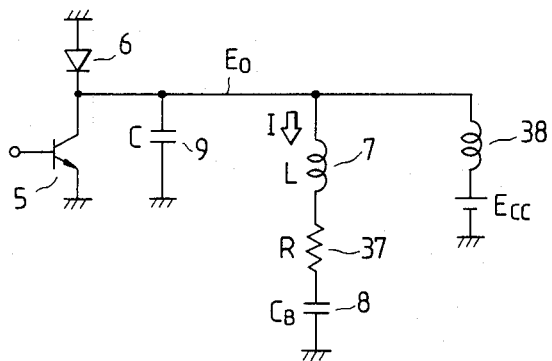
FIG. 5 is a circuit diagram of a conventional horizontal deflection circuit.

FIG. 5 shows a conventional horizontal output circuit for reference. In FIG. 5, components denoted by reference characters 5, 6, 7, 8 and 9 are the same as those denoted by the same reference characters in FIG. 1, and hence the description thereof will be omitted. In FIG. 5, indicated at 37 is the loss resistance and at 38 is a choke coil for a power supply. The supply voltage $E_{CC}$ must be varied in the range of about 25 V to 100 V according to the variation of the frequency $f_H$ of the horizontal synchronizing signal in the range of 16 kHz to 64 kHz. The horizontal output circuit has the problem of linearity degradation as follows.

When time t is measured from a moment when a horizontal scanning operation is started and an initial current is $I_{OP}$. Then, the gradient $I'(t)$ of a current curve $I(t)$ during a horizontal scanning time is expressed by $$-I'(t) = (E_8 - E_0)/L + I_{OP}R(1 - 2t/T_s)/L. \quad (6)$$

where $E_8$ is the potential of a bypass capacitor 8, $E_0$ is an output voltage, and $T_s$ is a horizontal scanning time.

Linearity deviation $\epsilon$ is defined by the relative deviation of expression (6). Therefore $$\epsilon(t) = \Delta I'(t)/I'(t) = \{-E_0 + I_{OP}R(1 - 2t/T_S)\}/E_8. \quad (7)$$

$E_0$ is about $-0.6$ V (a damper diode 6) in the former half of the horizontal scanning time and about 0.4 V in the latter half of the same (a horizontal output transistor 5).

Substituting $E_8 = 25$ V, $t = 0$ and $t = T_s$ into expression (7), we obtain $$\epsilon(0) = (0.6 + 1.2)/25 \approx 7\%$$

$$\epsilon(T_s) = -(0.4 + 1.2)/25 \approx -6\% \ldots \quad (8)$$

therefore $$\epsilon(0) - \epsilon(T_s) \approx 13\%$$

Thus, the conventional horizontal output circuit produces a linearity deviation of about 13% when the horizontal scanning frequency $f_H = 16$ kHz, and thereby the uniformity of the image is deteriorated. The present invention reduces the linearity deviation to one-third the foregoing value of the linearity deviation by cancelling the sawtooth wave component represented by the second term of expression (6) by the output voltage of the push-pull amplifier 17.

Figure 6:
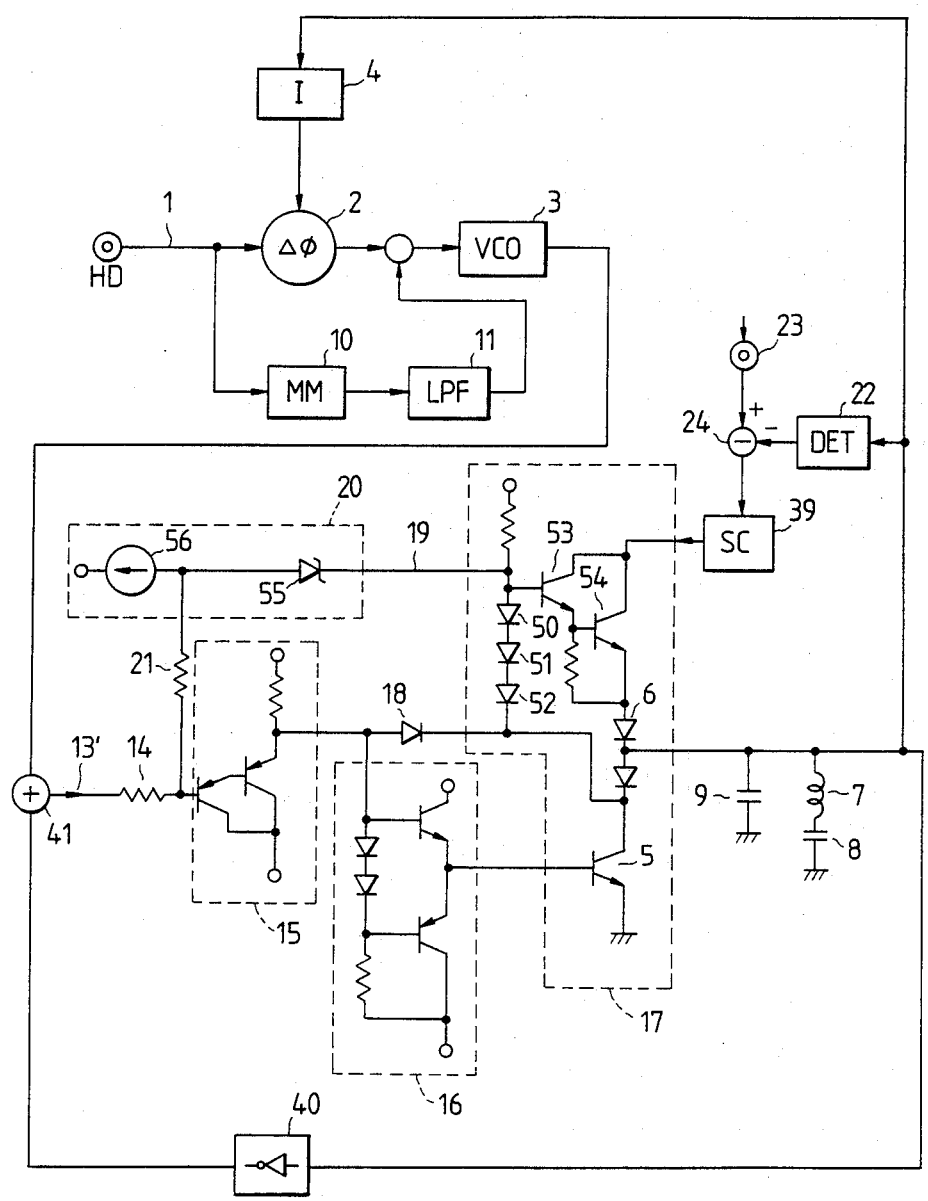
FIG. 6 is a circuit diagram of a horizontal deflection circuit in a second embodiment according to the present invention.
Figure 7:
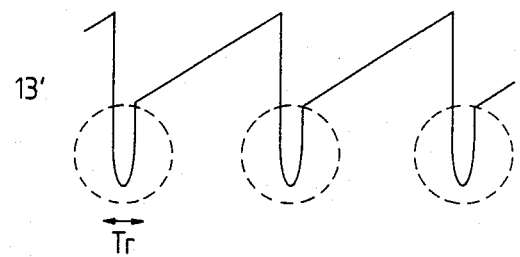
FIG. 7 is a waveform chart for explaining the operation of the horizontal deflection circuit of FIG. 6.

Second Embodiment (FIGS. 6 and 7)

A horizontal deflection circuit in a second embodiment according to the present invention differs from the horizontal deflection circuit of FIG. 1 in that the gain-controlled amplifier 12 is omitted and a controllable power supply 39 is provided additionally. The rest of the components of the horizontal deflection circuit of FIG. 6 are the same as those of the horizontal deflection circuit of FIG. 1, and hence the description thereof will be omitted.

Referring to FIG. 6, the output voltage of the controllable power supply 39 is controllable according to the output of the subtracter 24 in the range of 5 V±about 20%.

When flyback pulse voltage is insufficient, the output of the detector 22 decreases, the output of the subtracter 24 increases and the output voltage of the controllable power supply 39 increases, and thereby the amplitude of the signal having a sawtooth waveform on a line 19 increases. Consequently, an increased power is supplied to the deflection coil 7 and the bypass capacitor 8 to correct the amplitude of the flyback pulse.

The horizontal deflection circuit of FIG. 6 is further provided additionally with a damper 40 serving also as an inverter, and an adder 41. The damper 40 and the adder 41 add a negative pulse component enclosed by a circle in a waveform (13') shown in FIG. 7 to the output 13' of the adder 41, which ensures the horizontal output transistor 5 being cut off during the flyback time even in a transient abnormal state to reduce the possibility of failure.

In the second embodiment, a switching regulator is properly applied to controlling the controllable power supply 39. Interference between the power supply system and the horizontal deflection system can be reduced to a minimum extent by operating the switching regulator in synchronism with horizontal scanning at a switching frequency corresponding to the horizontal scanning frequency.

Figure 8:
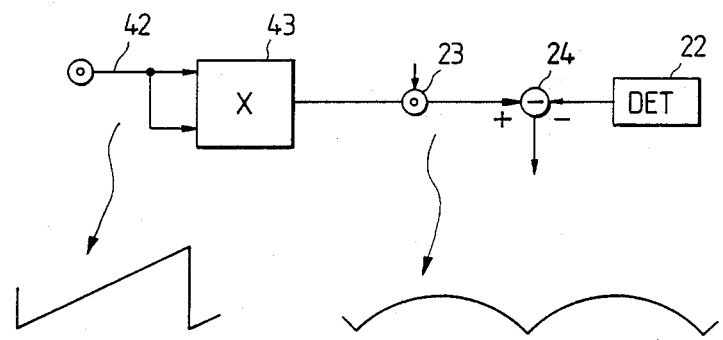
FIG. 8 is a block diagram of a horizontal deflection circuit in a third embodiment according to the present invention.

Third Embodiment (FIG. 8)

A horizontal deflection circuit in a third embodiment according to the present invention is substantially the same in construction as the foregoing horizontal deflection circuits embodying the present invention, and hence the description of parts like or corresponding to those of the foregoing horizontal deflection circuits will be omitted.

Figure 9:
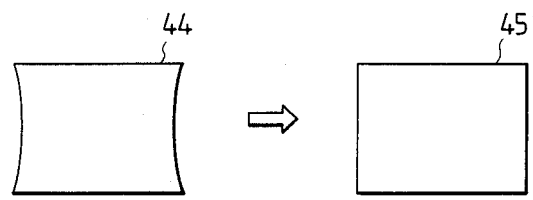
FIG. 9 is an illustration for explaining the effect of the horizontal deflection circuit of Fig. 8.

The horizontal deflection circuit in the third embodiment is provided with a pincushion distortion correcting means as shown in FIG. 8. Referring to FIG. 8, a multiplier 43 receives a sawtooth voltage 42 having a period corresponding to a vertical scanning period and provides an output signal having a parabolic waveform of a period corresponding to the vertical scanning period. The sawtooth voltage 42 corresponds to a vertical deflection current produced by the vertical deflection circuit of an ordinary display. The output of the multiplier 43 is applied to the terminal 23. Consequently, a distorted image plane 44 having the shape of a pincushion as shown in FIG. 9 is improved to obtain a correct image plane 45, because the horizontal deflection circuit controls the horizontal size of the image plane substantially in proportion to the voltage applied to the terminal 23.

The present invention is not limited in its application to the foregoing embodiments, and the following modifications are possible therein.

The horizontal output transistor 5 may be either a bipolar transistor or a field effect transistor. Although levels of voltages and currents processed by the horizontal deflection circuit employing a bipolar transistor as the horizontal output transistor are somewhat different from those processed by the horizontal deflection circuit employing a field effect transistor as the horizontal output transistor 5 due to difference between the bipolar transistor and the field effect transistor in input and output impedances, the operating modes of those horizontal deflection circuits are substantially the same. When the horizontal output transistor 5 has a short delay time between the ON-state and the OFF-state, the diode 18 may be omitted, and the phase detector 2 need not necessarily receive the sawtooth voltage from the integrator 4 which receives the flyback pulse and the sawtooth output signal of the voltage-controlled oscillator 3 may be given instead of the sawtooth output signal of the integrator 4 to the phase detector 2.

As is obvious from the foregoing description, the use of the sawtooth waveform (13) is significant for linearity improvement. However, in some fields of practical application, a rectangular waveform can be used. Although the use of a rectangular waveform instead of the sawtooth waveform (13) deteriorates the linearity in the central portion of the image plane, a parallel connection of a capacitor to the resistor 21 mitigates the sudden variation of the linearity and reduces a region in the central portion of the image plane where the linearity is deteriorated.

The damper diode 6 is an essential component of the push-pull amplifier 17. The horizontal deflection circuit may employ a push-pull amplifier of any optional type, such as a SEPP push-pull amplifier, provided that the push-pull amplifier includes a damper diode.

Since the present invention eliminates the choke coil 38 of the conventional horizontal deflection circuit (FIG. 5), the present invention is applicable to a single scan display as well as to a multiple scan display. The use of semiconductor devices instead of choke coils is advantageous because technical progress in semiconductor devices has reduced the price of semiconductor devices relative to that of choke coils.

A modification of the horizontal image plane size detecting means of the present invention will be described hereinafter.

The amplitude detecting circuit 22 employed in the horizontal deflection circuits of FIGS. 1 and 6 detects the flyback pulse voltage. The amplitude detecting circuit 22 may detect the current amplitude of the deflection coil 7 instead of the flyback pulse voltage. When the amplitude detecting circuit 22 is used for detecting the current amplitude of the deflection coil 7, a small resistor, for example, a resistor of about $0.1\ \Omega$ or below, is provided between the bypass capacitor 8 and the ground, and the amplitude of a sawtooth voltage across the small resistor can be detected by diode 31 and resistor 32 as shown in FIG. 4. On the contrary, the use of the sawtooth voltage itself without amplitude detection as a feedback signal to the resistor 21 for local negative feedback is inappropriate in an actual application, because parabolic voltage having the horizontal scanning period appears across the bypass capacitor 8 since the capacitance of the bypass capacitor 8 is not infinity. The parabolic voltage deforms the sawtooth waveform of the current flowing through the deflection coil 7 slightly in an S-shaped waveform and, if an S-shaped component is fed back through the resistor 21 to the level shifter 20, the waveform of the signal on the line 19 is distorted greatly. Therefore, amplitude detection is necessary of the present invention.

As is apparent from the foregoing description, a multiple scan display incorporating a horizontal deflection circuit in accordance with the present invention is capable of the continuous follow-up of wide variation in the horizontal scanning frequency of the input signal without requiring any high-voltage variable power supply having a large capacity.

What is claimed is:

1. A horizontal deflection circuit for a display incorporating a CRT, comprising:
   horizontal deflection coil means for generating a flyback pulse signal;
   bypass capacitor means connected in series to the horizontal deflection coil means;
   resonant capacitor means connected substantially in parallel to the horizontal deflection coil means;
   push-pull amplifying means for driving the horizontal deflection coil means; and
   damper diode means for damping and for preventing reverse flow, the damper diode means being connected in series to the push-pull amplifying means with the forward direction thereof along the direction of flow of a driving current produced by an amplifying unit of the push-pull amplifying means for a former half of horizontal deflection scanning;
   diode detecting means for detecting a horizontal size of an image plane of the CRT; and
   control means for controlling the horizontal size of the image plane through control of output power of the push-pull amplifying means on the basis of an output of the diode detecting means without utilizing a choke coil means for supplying power directly to the deflection coil means.

2. A horizontal deflection circuit according to claim 1, wherein said diode detecting means detects the amplitude of the flyback pulse signal.

3. A horizontal deflection circuit according to claim 1, wherein said diode detecting means detects the amplitude of a deflection current supplied to said deflection coil means.

4. A horizontal deflection circuit according to claim 1, wherein said control means controls the amplitude of a sawtooth signal for horizontal scanning.

5. A horizontal deflection circuit according to claim 1, wherein said control means controls the voltage of a power supply for said push-pull amplifying means.

* * * * *